Jan. 5, 1954 P. JACUSIS 2,664,746
PROPELLER METER
Filed Dec. 3, 1951 3 Sheets-Sheet 1

INVENTOR.
Peter Jacusis
BY
Moore, Olson & Trexler
attys.

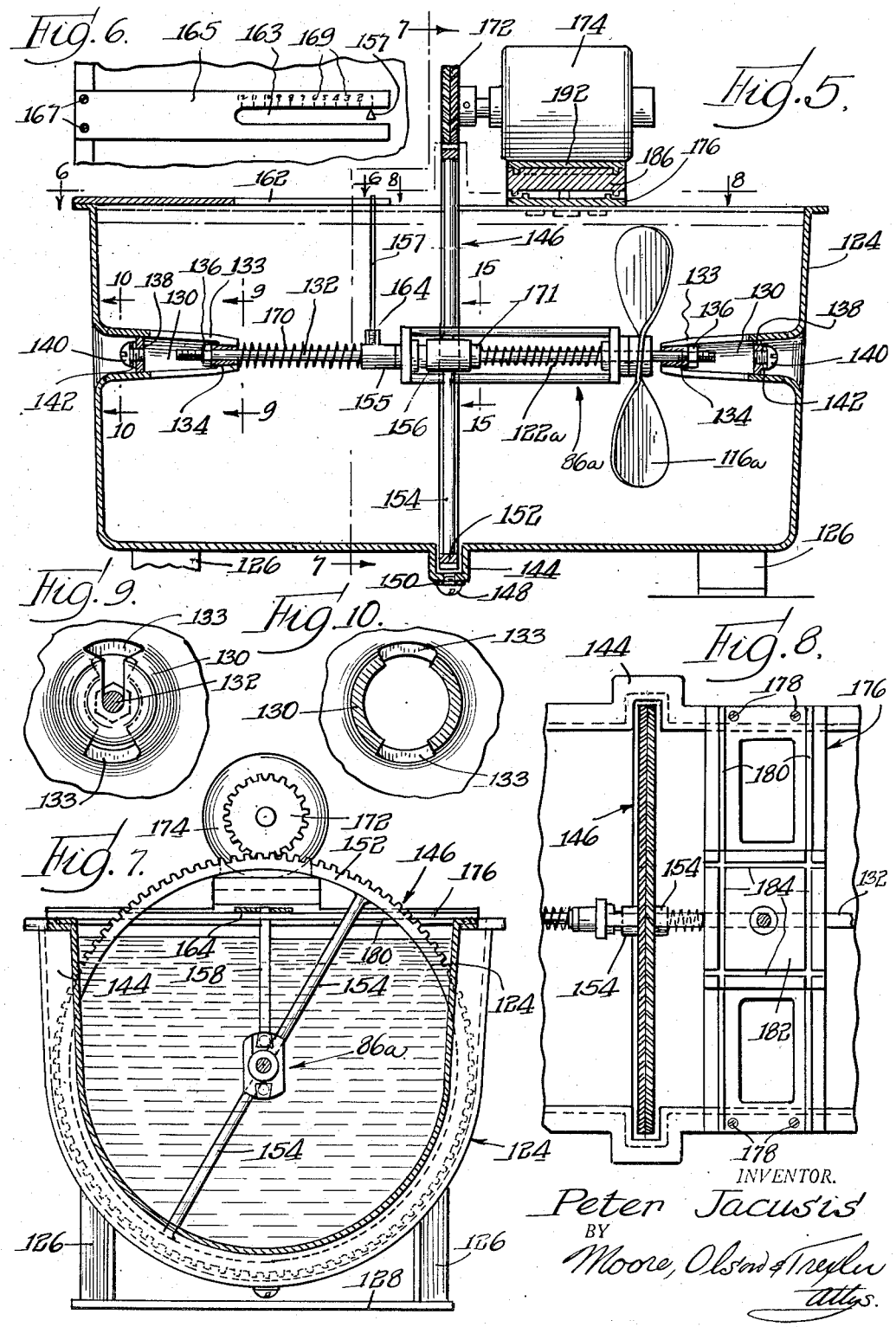

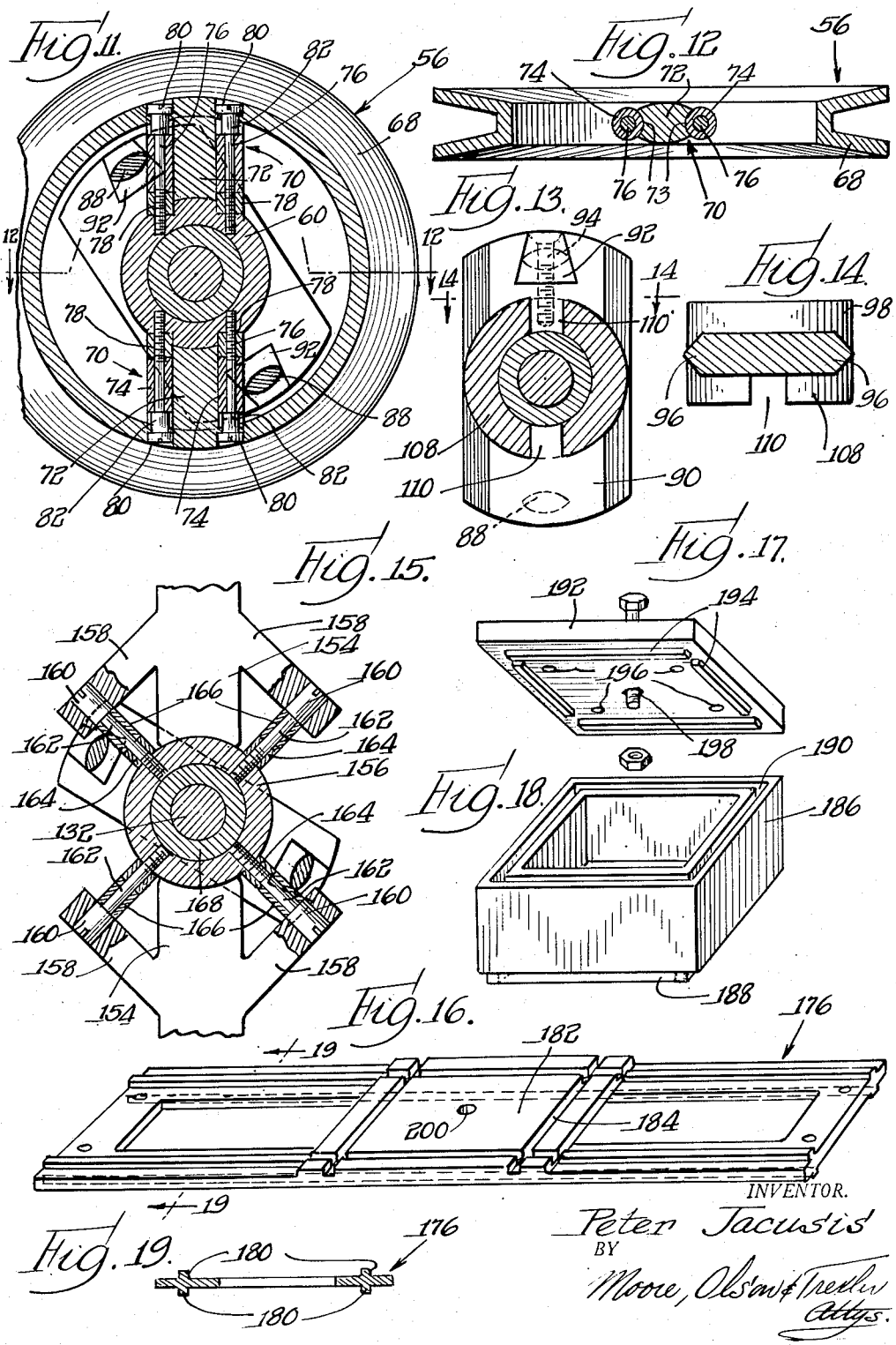

Patented Jan. 5, 1954

2,664,746

UNITED STATES PATENT OFFICE 2,664,746

PROPELLER METER

Peter Jacusis, Chicago, Ill.

Application December 3, 1951, Serial No. 259,641

8 Claims. (Cl. 73—140)

1

This invention is concerned with an apparatus for testing propeller thrusts.

It is difficult or impossible to calculate the thrust of propellers such as aircraft propellers, ships' screws, fan blades, and the like. Doubling the number of blades does not necessarily double the thrust, and changing the angle of attack of the blades does not change thrust proportional to the angle of attack. Turbulence of the air, water, or other fluid medium is one of the prime factors throwing off proportionals and rendering calculations difficult or impossible.

An object of this invention is to provide a new or improved apparatus for testing propellers; specifically for testing propeller thrust.

Another object of this invention is to provide a propeller meter having a propeller mount yielding proportionally to the thrust of the propeller.

A further object of this invention is to provide a propeller thrust meter reading the thrust of the tested propeller directly.

Yet another object of this invention is to provide a propeller thrust meter adapted to test the thrust of propellers of different sizes.

A further object of this invention is to provide a propeller thrust testing meter having an improved propeller shaft mount.

A still further object of this invention is to provide a propeller thrust testing meter having an improved propeller shaft drive.

Other and further objects and advantages of the present invention will be apparent from a study of the following specification when taken in conjunction with the accompanying drawings wherein:

Fig. 5 is a side view partially in section showing a modification of the apparatus of Fig. 1 for testing water thrust propellers;

Fig. 6 is an enlarged fragmentary view showing the thrust indicator and taken along the line 6—6 of Fig. 5;

Fig. 7 is a vertical sectional view taken substantially along the line 7—7 of Fig. 5 and showing the driving mechanism;

Fig. 8 is a horizontal view of the driving mechanism and taken substantially along the line 8—8 of Fig. 5;

Fig. 9 is a fragmentary vertical view partially in section taken along the line 9—9 of Fig. 5 and showing the propeller shaft mount;

Fig. 10 is a vertical section view along the line 10—10 of Fig. 5;

Fig. 11 is a detailed view of a portion of the drive mechanism of the first embodiment and taken substantially along the line 11—11 of Fig. 2;

Fig. 12 is a sectional view substantially along the line 12—12 of Fig. 11;

Fig. 13 is a fragmentary view taken substantially along the line 13—13 of Fig. 2 and showing details of construction of a portion of the propeller mounting mechanism;

Fig. 14 is a sectional view along the line 14—14 of Fig. 13;

Fig. 15 is a cross-sectional view of the second embodiment of the invention and similar to Fig. 11, the view being taken substantially along the line 15—15 of Fig. 5;

Fig. 16 is a perspective view of the transverse motor support for the second embodiment of the invention;

Fig. 17 is a perspective view of the motor platform supported by the transverse support of Fig. 16;

Fig. 18 is a view in perspective of a spacer member for adjusting the distance between the platform of Fig. 17 and transverse support of Fig. 16; and Fig. 19 is a cross-sectional view of the transverse motor support taken along the line 19—19 of Fig. 16.

Figure 1:
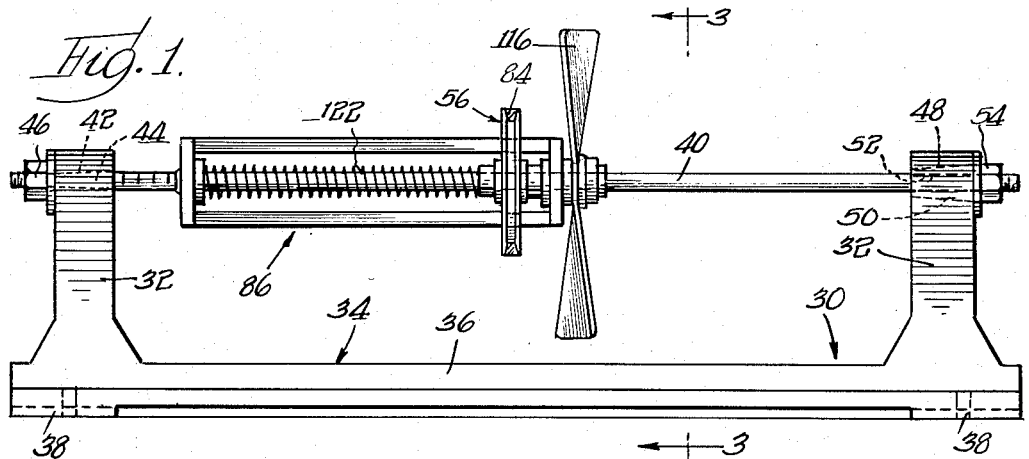
Fig. 1 is a side elevational view of an apparatus embodying the principles of my invention for testing air thrust propellers.

Referring first to Figs. 1–4 and 11–14, there is shown an embodiment of my invention adapted for testing air thrust propellers such as aircraft propellers and ventilating fans. The apparatus includes a base or pedestal 30 having a pair of upstanding supports 32 at either end of a longitudinal support member 34 which preferably comprises a pair of laterally spaced, parallel T-shaped beams or members 36. The upstanding supports 32 are substantially U-shaped and are inverted. Feet 38 are provided beneath the opposite ends of the longitudinal support 34 for supporting the base or pedestal 30. The upper portions or bights of the U-shaped end supports 32 are provided with filleted legs 41 extending downwardly to cross braces 43 (Fig. 3) between the longitudinal members 36, and the legs 41 and supports 32 are apertured to receive a propeller shaft 40.

The bore 42 in the left upright 32 (Fig. 1) is conical in configuration, being of greater diameter at the right or inside edge of the upright than at the left or outside edge. The cooperating portion 44 of the propeller shaft 40 is tapered complementary to the conical shape of the bore or aperture 42 so that the left end of the shaft can be wedged tightly in position by threading a nut 46 on the outer left end thereof. The bore or aperture 48 in the right upstanding support 32 also is tapered or conical in configuration, having its largest diameter to the right or outside. A frusto-conical plug 50 fits in the bore or aperture 48 and is provided with a cylindrical central bore 52 for receiving the right end of the propeller shaft 40. A nut 54 is threaded on the outer right end of the propeller shaft 40. Proper adjustment of the nut 54 allows the plug 50 and right shaft end to be wedged tightly into position at the same time the left end is wedged into position. A drive pulley 56 is rotatably mounted on the propeller shaft 40 by means of an antifriction bearing such as a sleeve bearing 58 fitting between the shaft 40 and the hub 60 of the pulley. The pulley is fixed against motion axially of the shaft 40 by a pair of antifriction washers 61 and a pair of collars 62 and 64 fixed to the shaft by means such as set screws 66.

Figure 2:
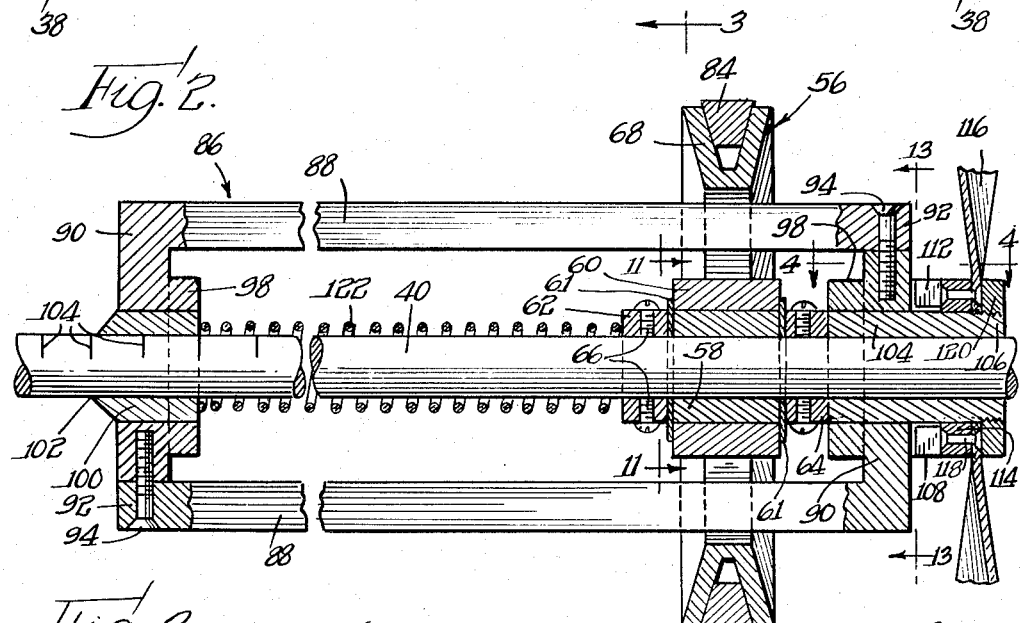
Fig. 2 is an enlarged fragmentary view showing the shiftable propeller mount taken along the line 2—2 of Fig. 3.

The pulley 56 as best seen in Figs. 2, 11, and 12 includes a substantially V-shaped rim 68 spaced from the hub 60 by a pair of spokes 70. The spokes 70 include central portions 72 integral with the rim 68 and having concave inner ends adapted for close cooperative engagement with the hub 60. The sides of the central portions 72 are concave at 73 for accommodating brass bearing sleeves 74. Screws 76 fit through the brass sleeves 74 and are threaded into the hub 60. Jam nuts 78 are threaded on the screws 76 against the hub 60, fitting into recesses in the hub, for locking the screws in position. The screw heads 80 fit within counterbored apertures in the rim 68, and enlarged shoulder portions 82 on the screws immediately adjacent the heads space the brass sleeves 74 inwardly from the rim. Approximately 1/64 inch play is provided between the ends of the sleeves 74 and the jam nuts 78 and enlarged shoulder portions 82 to allow freedom of movement of the sleeves.

Figure 3:
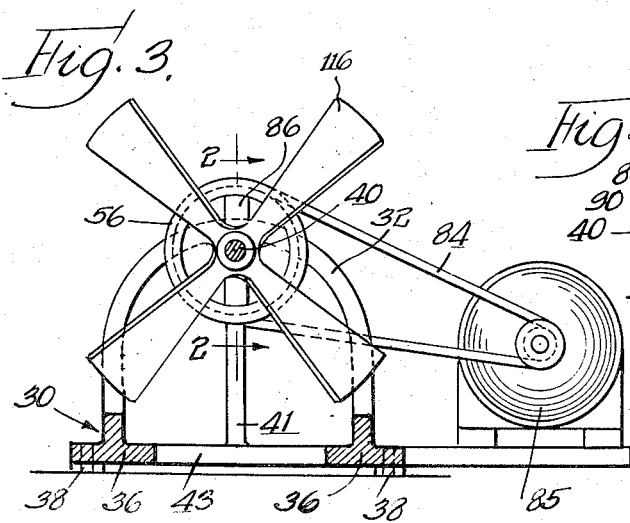
Fig. 3 is a vertical cross-sectional view taken along the line 3—3 of Fig. 1.

A belt 84 passes over the pulley 56 and is driven by any convenient power source such as an electric motor 85 (Fig. 3).

Figure 4:
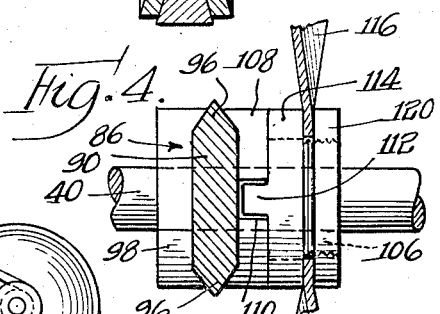
Fig. 4 is a sectional view of the propeller mount taken along the line 4—4 of Fig. 2.

A yoke 86 (Figs. 1–4) is rotatably mounted on the shaft 40 and comprises a pair of L-shaped members having longitudinal and transverse arms 88 and 90 respectively. The tip of each longitudinal arm 88 is substantially trapezoidal in form as shown at 92 in Figs. 11 and 13 and fits within a complementary shaped groove in the opposite transverse arm 90. The trapezoidal shape prevents outward movement of each of the longitudinal arms 88 from the opposite transverse arm 90. Screws 94 passing through the tips 92 and into the transverse arms 90 prevent relative axial movement of the two L-shaped pieces. The edges of the transverse arms 90 are provided with pointed edges 96 as shown in Fig. 4 for reducing air resistance. Each of the transverse arms 90 is provided with an enlarged and apertured central portion for receiving a shaft 40.

Each of the transverse arms 90 is formed with an inwardly directed boss 98 apertured for receipt of a bearing member. A sleeve bearing 100 having a beveled face to provide a knife edge 102 is fitted within the aperture in the leftmost transverse arm 90 and boss 98 (Fig. 2). The knife edge 102 is adapted for cooperation with scale markings 104 preferably provided with suitable indicia in thrust units such as foot-pounds. The right transverse arm 90 (Fig. 2) receives an elongated bearing sleeve 104 having a threaded outer end 106. In addition to the inner hub 98 on the right transverse arm 90, an outer hub 108 (Figs. 2, 4, 13, and 14) is provided on the right arm 90. The outer hub 108 is provided with a pair of diametrically spaced slots 110 for receiving tongues 112 on a propeller mounting ring 114. The propeller 116 to be tested is secured by rivets 118 or other suitable means to the ring 114 which fits over the outer end of the bearing sleeve 104. The interfitting of the tongues 112 and slots 110 insures rotation of the propeller with the bearing sleeve 104 and yoke 86. A locking ring 120 is threaded on the threaded outer end portion 106 of the bearing sleeve 104 and clamps the propeller 116 and propeller mounting ring 114 tightly against the outer hub 108.

The apparatus is completed by a coil spring 122 compressed between the collar 62 fixed on the shaft 40 and the sleeve bearing 100 fixed in the yoke 86 and axially slidable on the shaft 40. The spring 122 normally maintains the yoke in its extreme leftmost position as shown in Figs. 1 and 2 with the elongated sleeve bearing 104 impinging against the collar 64 fixed on the shaft 40.

Rotation of the pulley 56 by the belt 84 causes a pair of the brass bearing sleeves 74 to impinge against the longitudinal yoke arms 88 as shown in Fig. 11, the yoke arms preferably being substantially oblong as shown in Fig. 11 for best engagement. Impinging of the brass bearing sleeves 74 of the spokes 70 against the longitudinal yoke arms 88 causes rotation of the yoke and consequently of the propeller 116. The thrust exerted by the propeller 116 on the air causes the yoke to be drawn to the right against the action of the spring 122, and the thrust can be read directly from the scale markings 104 as they appear against the knife edge 102 of the bearing 100.

It will be apparent that the rotational speed can be varied by having a variable speed motor as a power source, by changing the drive pulley on the power source, or by the use of any suitable speed changing mechanism to facilitate testing of a propeller over a considerable speed range and to accommodate propellers of different sizes.

A modified form of the invention, but utilizing the same basic concepts, is shown in Figs. 5–10 and 15–19 for testing ships' screws or other propellers to be used in water or other liquids. In this form of the invention a tub 124 of substantially U-shaped cross section is supported near either end by suitable legs 126 and cross braces 128. The tub is provided at either end with inwardly extending nipples or frusto-conical like projections 130 for supporting a propeller shaft 132. The projections 130 are slotted at top and bottom as at 133 for allowing sidewise motion of the shaft 132 for insertion or removal. Frusto-conical plugs 134 fit into properly shaped apertures at the ends of the projections 130 for receiving the shaft 132 and are clamped into place by nuts 136 threaded on the ends of the shaft. The projections 130 are sealed against leaking of water by the provision of plates or bulkheads 138 welded or otherwise secured within the projections outwardly of the slots 133. The plates or bulkheads 138 are provided with central apertures for passage of the shaft 132 and these apertures normally are closed by screws 140 threaded thereinto, rubber gaskets 142 being clamped beneath the screw heads.

The tub 124 is provided about its mid section with an outwardly extending channel 144 for accommodating a gear 146 having a greater diameter than the width of the tub. The lowermost part of the channel is provided with a drain hole closed by a screw plug 148 and clamping a rubber washer or gasket 150 beneath the screw head and on the bottom of the channel.

The gear 146 is rotatably mounted on a fixed propeller shaft 132 and includes a ring 152 having peripheral teeth. A pair of spokes 154 is secured to the ring 152 by means such as welding and extends inwardly therefrom to the hub 156 (Fig. 15). The inner end of each spoke 154 is concave for engagement with the hub 156 which is in the form of a cylindrical sleeve. A pair of arms 158 extends outwardly from near the inner end of each spoke 154 and at an angle to the spoke. The heads 160 of screws 162 fit in apertures near the ends of the arms, and the apertures may be counterbored if desired. The inner ends of the screws 162 are threaded into the hub 156, and a collar or nut 164 is threaded on each screw 162 for clamping against the hub 156 and thus locking the screws in place. Brass bearing sleeves 166 are positioned by the arms 158 and nuts 164 on the screws 162. A bearing sleeve 168 fits within the hub 156 and is locked against it.

The bearing 168 and sleeve 156 are fixed against axial shifting by means such as a pair of washers (not shown) and a pair of collars 171 as shown in Fig. 5.

The testing apparatus includes a yoke 86a similar to the yoke 86 previously described and differing therefrom only in having the propeller end of the yoke urged away from the gear 146. The ships' screw or other water propeller 116a is mounted on the yoke in a similar manner to that in which the air propeller 116 is mounted. The coil spring 122a normally urges the yoke 86a and propeller or screw 116a to the right as shown in Fig. 5. Rotation of the gear 146 and hence of the yoke 86a and propeller 116a forces the yoke and propeller to the left against the action of spring 122a.

A sleeve 155 fits over the shaft 132 immediately to the left of the yoke 86a and in contact therewith. A pointer 157 is riveted, bolted, or otherwise suitably secured to an upstanding flange 161 on the sleeve 155. The pointer 157 has an upper end of triangular cross section as shown in Fig. 6 and fits in a slot 163 in a plate 165 secured to the rim of the tub by means such as screws 167 and extending inwardly from the end of the tub. Suitable scale markings and indicia 169 are provided on the plate 165 for cooperation with an edge of the pointer to read the propeller thrust directly in suitable units such as foot-pounds. The sleeve 155 is pushed to the left by the yoke 86a and may be left at its point of maximum displacement so that the pointer 157 will read the maximum thrust, or means may be provided for maintaining the sleeve 155 in engagement with the end of the yoke. Such means might consist of a coil spring 170 compressed between the sleeve 155 and the left inward projection 130. In this case it will be understood that the springs 122a and 170 together make up the force against which the propeller thrust must act and the two springs will be suitably calibrated together.

The drive gear 146 is driven by a gear 172 on the output shaft of a motor 174. Both of the gears 146 and 172 preferably are herringbone gears as shown in Figs. 5 and 8. Means is provided for supporting the motor at different heights so that the size of the gear 172 can be varied in order to provide different operational speeds. This means comprises a transverse motor support 176 (Figs. 5, 8, 16, and 19) secured across the top of the tub adjacent the gear 146 by means such as screws 178. The transverse motor support 176 comprises an open frame member of flat construction and having rigidifying ribs 180. A solid central rectangular plate or platform 182 comprises an integral part of the transverse motor support and is provided near its periphery with grooves 184 in its top surface.

A rectangular box-like structure 186 (Figs. 5 and 18) having four side walls is provided with depending ribs 188 on its lower edges. These ribs fit into the grooves 184 of the central platform 182. The top edge of the box-like structure 186 is provided with grooves 190 and a motor platform 192 (Figs. 5 and 17) is provided with depending ribs 194 fitting into the grooves 190. The motor platform is provided with suitable apertures 196 for receiving mounting bolts securing the motor against the top of the platform. The platform is centrally bored at 198, and the central plate or platform 182 of the transverse motor support is bored at 200 in alignment with the bore 198. A single bolt passed through the apertures or bores 198 and 200 clamps the motor platform down against the box-like structure 186 and clamps the box-like structure down against the central plate or platform 182. The cooperating ribs and grooves assure perfect alignment of the motor platform 192, box-like structure 186, and central plate or platform 182.

A plurality of box-like structures 186 of different heights is provided and these structures are changed at the same time as the gear 172 so that the gear 172 at all times remains properly meshed with the drive gear 146.

It is apparent that in both modifications of my invention I have provided a propeller meter or apparatus for measuring the thrust of propellers in any fluid medium and reading the thrusts directly in foot-pounds or other units. Although two specific forms of the invention have been shown and described, it is to be understood that this is for illustrative purposes only and my invention includes all that which falls within the spirit and scope of the appended claims.

I claim:

1. A propeller thrust testing meter comprising a shaft, propeller mounting means, said mounting means being movable substantially axially of said shaft in response to propeller thrust reaction, resilient means normally biasing said mounting means to a given position, means for rotating said propeller mounting means, indicating means, said indicating means being continuously readable, and means for actuating said indicating means in accordance with the substantially axial movement of said propeller mounting means.

2. A propeller thrust testing meter comprising a shaft, propeller mounting means, said mounting means being movable substantially axially of said shaft in response to propeller thrust reaction, a spring normally biasing said mounting means to a given position, rotary driving means secure for movement with said propeller mounting means, indicating means, and means for actuating said indicating means in accordance with the substantially axial movement of the movable part of said propeller testing means.

3. A propeller thrust testing meter comprising a shaft, means for fixedly mounting said shaft, propeller mounting means rotatably mounted on said shaft and movable longitudinally of the shaft in response to propeller thrust reaction, resilient means for resisting axial movement of the propeller mount, an indicator on said shaft and movable longitudinally thereon with said propeller mounting means, and a scale having indicia cooperable with said indicator.

4. A propeller thrust testing meter as set forth in claim 3 wherein the scale and indicia are on the shaft and the indicator comprises a line on said propeller mounting means.

5. A propeller thrust testing meter as set forth in claim 3 wherein the scale includes a bifurcated member having the indicia thereon, and the indicator includes a pointer positioned between the bifurcations.

6. A propeller thrust testing meter comprising a shaft, supports at opposite ends of said shaft, conical portions at the ends of said shaft for wedging said shaft in said supports, propeller mounting means on said shaft and rotatable about the axis of said shaft, at least a part of said mounting means being movable substantially axially of said shaft in response to propeller thrust reaction, resilient means for resisting axial movement of the propeller mount means for rotating said propeller mount, and an indicator operable in accordance with the substantially axial movement of said mounting means part to indicate the propeller thrust.

7. A propeller thrust testing meter comprising a shaft, means for fixedly mounting said shaft, propeller mounting means rotatably mounted on said shaft and axially slidable along said shaft in response to propeller thrust reaction, a coil spring surrounding said shaft and urging said propeller mounting means against propeller thrust reaction, means for rotating said propeller mounting means, a fixed scale arranged parallel to the axis of said shaft, and an indicator cooperable with said scale and movable longitudinally of the axis of said shaft with the propeller mounting means.

8. A propeller thrust testing meter for water as set forth in claim 7, and further including a tub, wherein said fixed scale arranged parallel to the axis of said shaft comprises a fixed plate secured to the rim of the tub and extending inwardly from the end of the tub.

PETER JACUSIS.

References Cited in the file of this patent

UNITED STATES PATENTS

| Number | Name | Date |
|---|---|---|
| 954,077 | Clement | Apr. 5, 1910 |
| 1,405,176 | Zahm | Jan. 31, 1922 |
| 1,629,114 | Mascolo | May 17, 1927 |
| 1,775,756 | Frohwerk | Sept. 16, 1930 |